2,795,616

Patented June 11, 1957

2,795,616

PROCESS FOR THE PREPARATION OF CYCLOHEXANONE

John W. Churchill, Kenmore, and Bobby F. Dannels, Tonawanda, N. Y., assignors to Olin Mathieson Chemical Corporation, a corporation of Virginia No Drawing. Application August 24, 1954,
Serial No. 451,958

9 Claims. (Cl. 260—586)

Our invention relates to an improved process for the manufacture of cyclohexanone. More particularly, our invention involves the acidification of aqueous solutions of salts of nitrocyclohexane with sulfur dioxide.

Cyclohexanone is an important solvent and chemical intermediate. As a solvent it is extensively used in the formulation of pesticidal concentrates and in the manufacture of cyclohexanone oxime. The oxime can be rearranged to caprolactam, a material which is readily polymerized to an excellent fiber-forming polymer.

Cyclohexanone has previously been prepared in several ways, including the oxidation of cyclohexane with air, by the oxidation of cyclohexanol resulting from the hydrogenation of phenol, and cyclohexanone has also been produced by the acidification of aqueous solutions of its salts using strong mineral acids. Thus, an aqueous solution of sodium nitrocyclohexane can be acidified with sulfuric acid to produce cyclohexanone and other products in yields of about 80–85 percent of cyclohexanone, based on the sodium nitrocyclohexane charged.

In the process of our invention, substantially quantitative yields of the desired product are obtained. Our process yields cyclohexanone of high purity, since when the cyclohexanone is converted by means of hydroxyl amine to cyclohexanone oxime and the oxime is rearranged to form caprolactam the caprolactam has a high degree of stability towards oxidation on standing and is especially suitable for polymerization to a fiber-forming polymer. The process of our invention is adaptable to continuous operation, the reaction being very rapid and no extended contact times being required.

The process of our invention comprises the addition of aqueous solutions of salts of nitrocyclohexane to an aqueous medium maintained at a pH between one and two by the addition of sulfur dioxide, a compound which has reducing as well as acidic properties. The cyclohexanone produced can then be recovered from the aqueous reaction mixture. The first step of the process appears to be the formation of a cyclohexanone-bisulfite addition compound. Thus, when the sodium salt of nitrocyclohexane is used the first reaction appears to be as follows:

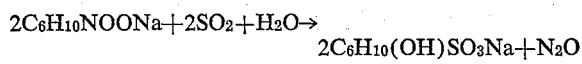

The addition compound can be decomposed in any of several ways to recover cyclohexanone. It can be decomposed by heating, for example, principally according to the equation:

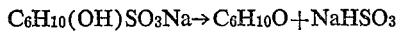

Some sulfur dioxide is formed by thermal decomposition of the bisulfite according to the equation:

Other methods of product recovery are described below.

The following examples illustrate in detail the practice of our invention and are to be considered not limitative.

*Example I*

A solution of sodium nitrocyclohexane was prepared by dissolving 0.25 gram mole of distilled nitrocyclohexane in 100 ml. of water containing 0.275 gram mole of sodium hydroxide. This solution was added dropwise over a period of 35 minutes to 200 ml. of water contained in a 1500 ml. indented resin kettle. During this addition, sulfur dioxide gas was simultaneously introduced below the surface of the liquid in the kettle through a fritted glass diffuser. The temperature of the reaction mixture was maintained between 20 and 30° C. and the pH between 1.5 and 2. The reaction mixture was distilled at atmospheric pressure and 474 grams of distillate, consisting of an upper cyclohexanone layer and a lower aqueous layer, was taken overhead.

For the purpose of determining whether or not cyclohexanone oxime was formed, the distillate was neutralized with 10 percent aqueous caustic soda and extracted with cyclohexane. No cyclohexanone oxime was found in the extract but about 30 percent of the cyclohexanone produced was extracted. The aqueous portion remaining from the extraction was made strongly alkaline by the further addition of caustic and was then re-extracted with cyclohexane. The total amount of cyclohexanone recovered in both extractions corresponded to a yield based on the nitrocyclohexane charged of 98.2 percent.

For comparison, the procedure of this example was repeated, but using sulfuric acid as an acidifying agent, and maintaining a pH of 1.5 to 1.8. The yield of cyclohexanone obtained was only 82.6 percent.

*Example II*

A solution of sodium nitrocyclohexane was prepared from 0.25 gram mole of nitrocyclohexane, 0.275 gram mole of sodium hydroxide and 100 ml. of water. The solution also contained 0.025 gram mole of sodium nitrite and 0.025 gram mole of sodium nitrate. This solution was added dropwise to 200 ml. of water in a 1500 ml. indented resin kettle. During the addition, sulfur dioxide gas was simultaneously introduced below the surface of the liquid in the kettle through a fritted glass diffuser. The temperature of the reaction mixture was maintained between 20 and 30° C. and the pH between 1.5 and 1.8. After the addition of the sodium nitrocyclohexane solution had been completed, the cyclohexanone produced was taken overhead by distillation at atmospheric pressure. The yield of cyclohexanone produced based on the nitrocyclohexane was 99.6 percent. This example illustrates that the sodium nitrite and sodium nitrate impurities had practically no effect on the yield of product produced in accordance with our invention.

*Example III*

A solution of sodium nitrocyclohexane was prepared by dissolving 0.25 gram mole of crude nitrocyclohexane recovered from the nitration of cyclohexane in 100 ml. of water containing 0.275 gram mole of sodium hydroxide. This solution was added dropwise to 200 ml. of water in a 1500 ml. indented resin kettle while sulfur dioxide gas was simultaneously introduced below the surface of the liquid in the kettle through a fritted glass diffuser. The temperature of the reaction mixture was maintained between 20 and 30° C. and the pH between 1.5 and 1.8. After the addition of the sodium nitrocyclohexane solution had been completed, the reaction mixture was distilled at atmospheric pressure to produce an overhead containing cyclohexanone in a yield of 99.0 percent based on the nitrocyclohexane charged.

Example IV 197 grams of a solution of the sodium salt of nitrocyclohexane containing the equivalent of 22.8 percent of nitrocyclohexane by weight was added to 150 ml. of water in a small resin kettle. Sulfur dioxide gas was simultaneously introduced through a gas diffuser into the liquid in the kettle to maintain the pH at 1. The temperature was maintained at −2 to −4° C. The addition of the sodium nitrocyclohexane solution required approximately 30 minutes. After the addition, the reaction mixture was distilled at atmospheric pressure and the distillate recovered was extracted as described in Example I to obtain a yield of 94.7 percent of cyclohexanone in admixture with cyclohexane.

Example V

A solution of the ammonium salt of nitrocyclohexane was prepared in 2 percent by weight aqueous ammonium hydroxide. The solution, amounting to 380 ml. and containing 0.24 gram mole of ammonium nitrocyclohexane, was added dropwise to 200 ml. of water in a small resin kettle. Sulfur dioxide gas was simultaneously introduced into the reaction mixture through a fritted glass diffuser to maintain the pH at 1.5 to 1.8. The temperature was maintained at 22–25° C. The reaction mixture was distilled at atmospheric pressure to provide a distillate consisting of an upper cyclohexanone layer and a lower aqueous layer, and this distillate was extracted as described in Example I to obtain a mixture of cyclohexanone and cyclohexane containing 90.3 percent of cyclohexanone based on the ammonium nitrocyclohexane employed in the reaction.

Various modifications can be made in the procedures of the specific examples to provide other embodiments which fall within the scope of our invention. Thus, other water-soluble salts of nitrocyclohexane, particularly alkali metal salts such as the potassium salt, can be substituted for the sodium nitrocyclohexane and ammonium nitrocyclohexane used. The ammonium salt of nitrocyclohexane can be used with advantage. This particular salt is easily prepared, the required ammonia is cheaper per mole of base than sodium hydroxide, and by-product ammonium sulfate has value as a fertilizer.

The process of our invention is applicable to treatment of salts derived from pure nitrocyclohexane or from less pure samples. Crude nitrocyclohexane derived from the nitration of cyclohexane can contain appreciable quantities of nitrogen peroxide. On dissolving such nitrocyclohexane in caustic, sodium nitrite and sodium nitrate are formed. As shown more in detail in Example II, minor amounts of these impurities have no deleterious effect on the substantially quantitative yields obtained by the process of our invention.

As the specific examples illustrate, the process of the present invention can be carried out using widely different temperatures. Satisfactory results are obtained at temperatures as low as −5° C. but this adds to the cost by requiring refrigeration and there appears to be no particular advantage in using reaction temperatures below room temperature. Reaction temperatures considerably above room temperature, for example 50° C. can also be employed, if desired.

In accordance with our process, the aqueous solution of the salt of nitrocyclohexane is acidified by adding it to an aqueous reaction medium which is maintained at a pH between 1 and 2 by the addition of sulfur dioxide. The maintenance of a pH within this range is important, inasmuch as significantly lower yields of cyclohexanone are obtained when the pH is maintained at about 3 or higher. After the addition of the aqueous solution of nitrocyclohexane salt to the reaction mixture has been completed, the cyclohexanone can be recovered by any of various means. Where heating is used, for example, the reaction mixture can be steam distilled, as the specific examples illustrate, to drive water and cyclohexanone overhead. The aqueous layer which separates can be recycled to the still and the cyclohexanone layer recovered and further purified, if desired. The addition of strong caustic to the reaction mixture upon completion of the addition of the aqueous solution of nitrocyclohexane salt serves to retain sulfur dioxide in the reaction mixture in the form of sodium sulfite. Thus, in Example I the reaction mixture can be made alkaline before the distillation to retain sulfur dioxide in chemically combined form in the bottoms. On the other hand, Example I could be so modified as to make the distillate strongly alkaline before carrying out the extraction with cyclohexane. Also, if desired, strong acids, such as sulfuric acid, can be added to the reaction mixture immediately prior to distillation to aid in cyclohexanone recovery when the reaction mixture is distilled.

We claim:
1. A method for the preparation of cyclohexanone which comprises adding an aqueous solution of at least one salt of nitrocyclohexane to an aqueous medium maintained at a pH of 1 to 2 by the addition of sulfur dioxide and recovering cyclohexanone from the reaction mixture.

2. A method according to claim 1 in which said salt is a sodium salt.

3. A method according to claim 1 in which said salt is an ammonium salt.

4. A method according to claim 1 in which the recovery of cyclohexanone is effected from the reaction mixture by distillation.

5. A method according to claim 1 in which said salt is a sodium salt and in which the recovery of cyclohexanone is effected from the reaction mixture by distillation.

6. A method according to claim 1 in which said salt is an ammonium salt and in which the recovery of cyclohexanone is effected from the reaction mixture by distillation.

7. In the manufacture of cyclohexanone by acidifying an aqueous solution of a salt of nitrocyclohexane, the step of adding an aqueous solution of at least one salt of nitrocyclohexane to an aqueous medium maintained at a pH of 1 to 2 by the addition of sulfur dioxide.

8. A method according to claim 7 in which said salt is a sodium salt.

9. A method according to claim 7 in which said salt is an ammonium salt.

References Cited in the file of this patent

UNITED STATES PATENTS

| | | |
|---|---|---|
| 2,267,375 | Johnson | Dec. 23, 1941 |
| 2,544,562 | Michael | Mar. 6, 1951 |

OTHER REFERENCES

Von Schickh, Chemie und Technologie der Nitroalkane, Angewandt Chemie, 62, page 555 (1950).